United States Patent
Kim

(10) Patent No.: US 10,317,615 B2
(45) Date of Patent: Jun. 11, 2019

(54) OUTDOOR DISPLAY APPARATUS

(71) Applicant: SAMSUNG ELECTRONICS CO., LTD., Suwon-si (KR)

(72) Inventor: Sung Ki Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/855,067

(22) Filed: Dec. 27, 2017

(65) Prior Publication Data

US 2018/0180798 A1  Jun. 28, 2018

(30) Foreign Application Priority Data

Dec. 28, 2016 (KR) .................... 10-2016-0180826

(51) Int. Cl.
*F21V 8/00* (2006.01)
*G02F 1/1335* (2006.01)

(52) U.S. Cl.
CPC ..... *G02B 6/0085* (2013.01); *G02F 1/133608* (2013.01); *G02F 2001/133612* (2013.01); *G02F 2001/133628* (2013.01)

(58) Field of Classification Search
CPC ............ G02B 6/0085; G02B 6/3814; G02F 1/133608; G02F 2001/133612; G02F 2001/133628; F21V 29/002; F21V 29/02; F21V 29/504; H01L 33/64
See application file for complete search history.

(56) References Cited

U.S. PATENT DOCUMENTS

| | | | |
|---|---|---|---|
| 7,319,589 B1 | 1/2008 | Heady | |
| 2006/0279216 A1* | 12/2006 | Kim | G02B 6/0055 313/631 |
| 2007/0114010 A1 | 5/2007 | Upadhya et al. | |
| 2008/0253080 A1 | 10/2008 | He et al. | |
| 2010/0078152 A1 | 4/2010 | Nakamichi et al. | |
| 2011/0037390 A1* | 2/2011 | Ko | F21V 29/02 315/117 |
| 2012/0026432 A1 | 2/2012 | Dunn et al. | |
| 2012/0069549 A1 | 3/2012 | Hsu et al. | |
| 2012/0320566 A1* | 12/2012 | Namekata | G02F 1/133603 362/97.3 |
| 2018/0107068 A1* | 4/2018 | Sasaki | F21S 2/00 |

OTHER PUBLICATIONS

Communication dated Apr. 10, 2018 issued by the International Searching Authority in counterpart International Application No. PCT/KR2017/015080 (PCT/ISA/210).

* cited by examiner

*Primary Examiner* — Joseph L Williams
*Assistant Examiner* — Jose M Diaz
(74) *Attorney, Agent, or Firm* — Sughrue Mion, PLLC

(57) ABSTRACT

Disclosed is a display apparatus including a display panel on which an image is displayed. The outdoor display apparatus may include a light source module including a light source configured to generate light, and disposed behind the display panel, a rear chassis configured to support the light source module and disposed behind the light source module, a heat collection device supported by the rear chassis and including a heat collection part disposed to correspond to the light source module and a discharge part configured to discharge heat collected in the heat collection part and transferred to the discharge part, and a heat discharge device configured to discharge the heat discharged from the discharge part to an outside of the display apparatus.

18 Claims, 15 Drawing Sheets

OUTDOOR DISPLAY APPARATUS

CROSS-REFERENCE TO RELATED APPLICATION

This application claims priority from Korean Patent Application No. 10-2016-0180826, filed on Dec. 28, 2016 in the Korean Intellectual Property Office, the disclosure of which is incorporated herein by reference.

BACKGROUND

1. Field

Apparatuses and methods consistent with example embodiments relate to an outdoor display apparatus, and more particularly, to an outdoor display apparatus with a heat dissipation structure.

2. Description of the Related Art

Generally, a display apparatus is a device for displaying an image on a screen, such as a television, a computer monitor, a digital information display, or the like. Recently, there have been many cases in which such a display apparatus is installed outdoors for the purpose of advertisement or the like. A billboard disposed on the outside of a building and displaying an image and the like are examples of these outdoor display devices.

As an outdoor display apparatus is sometimes directly exposed to sunlight, its surface temperature may rise excessively and its components may deteriorate.

In addition, the display apparatus may include a display panel (e.g., a liquid crystal panel) and a backlight unit for radiating light toward a back surface of the liquid crystal panel. The liquid crystal panel may be formed of a pair of substrates facing each other with a liquid crystal layer interposed therebetween. The backlight unit may be provided with a light source configured to emit light toward the liquid crystal panel. A light source of the backlight unit may generate light and also radiate heat which causes the liquid crystal panel to be heat-degraded.

Accordingly, the display apparatus may have a heat dissipation structure configured to prevent deterioration of the liquid crystal panel. The heat dissipation structure may be implemented by a structure including a fan and an air filter.

Since the above-described heat dissipation structure occupies a considerable volume, there is a limit in the application of this heat dissipation structure to a display apparatus having a slim design. Specifically, for a heat dissipation structure including a fan and an air filter, the air filter should be periodically replaced with a new air filter, which requires a high maintenance cost.

SUMMARY

One or more example embodiments provide an outdoor display apparatus having an improved structure capable of preventing deterioration of a liquid crystal panel and a malfunction and shortening of a lifetime of a product by controlling a temperature of a light source such as a light emitting diode (LED).

It is another aspect of the present disclosure to provide an outdoor display apparatus having an improved structure capable of preventing deterioration of a liquid crystal panel caused by sunlight without an infrared light reflection layer being applied thereto, and preventing a malfunction and shortening of a lifetime of a product by controlling a temperature of a light source such as a LED.

It is still another aspect of the present disclosure to provide a display apparatus including a heat transfer pattern for effectively dispersing or adjusting heat generated in a product or externally introduced thereto to minimize thermal deformation of an internal optical sheet and components of the product.

It is yet another aspect of the present disclosure to provide an outdoor display apparatus having an improved structure allowing a product having a slim design to be realized.

It is yet another aspect of the present disclosure to provide an outdoor display apparatus having an improved structure to have a simple heat dissipation structure.

Additional aspects of the invention will be set forth in part in the description which follows and, in part, will be obvious from the description, or may be learned by practice of the invention.

According to an aspect of an example embodiment, an outdoor display apparatus may include a display panel on which an image is displayed; a light source module including a light source configured to generate light, the light source module being disposed behind the display panel; a rear chassis configured to support the light source module and disposed behind the light source module; a heat collection device supported by the rear chassis and including a heat collection part, which is disposed at a location corresponding to the light source module, and a discharge part configured to discharge heat collected in the heat collection part and transferred to the discharge part, and a heat discharge device configured to discharge the heat discharged from the discharge part to an outside of the display apparatus.

The heat collection device may include a heat pipe.

The heat collection device may be configured to transfer the heat, which is collected in the heat collection part by a refrigerant flowing in the heat collection device, to the discharge part.

The heat pipe may include a first region disposed to correspond to the light source module and a second region bent and extending from the first region. The heat collection part may be formed at the first region. The discharge part may be formed at the second region.

The first region may be disposed at an edge side of the rear chassis, and the second region bends and extends from the first region in a direction towards a central portion of the rear chassis.

The heat pipe may be disposed to be coplanar with the rear chassis and is seated and supported in a supporting groove formed to be concave from a front side of the rear chassis to a rear side of the rear chassis.

The heat discharge device may be coupled to a rear side of the rear chassis and is disposed at the central portion of the rear chassis.

The heat discharge device may include a blowing fan configured to blow the heat to the outside.

The heat discharge device may include a heat exchange fin configured to exchange the heat with outside air.

The heat collection device may include a liquid cooling tube connected to the display apparatus from the outside of the display apparatus.

The liquid cooling tube may include a first region disposed inside the display apparatus and a second region disposed outside the display apparatus. The heat collection part may be formed at the first region, and the discharge part may be formed at the second region.

The heat discharge device may include a pump provided to allow a liquid to flow in the liquid cooling tube, and a heat exchange fin configured to allow the liquid to exchange heat with outside air.

The heat discharge device may be disposed outside the display apparatus and is connected to the second region.

The outdoor display apparatus may further include a heat conductor provided between the light source module and the heat collection device.

In accordance with an aspect of an example embodiment, a display apparatus may include a display panel on which an image is displayed; a light source module including a light source configured to generate light, the light source module being disposed behind the display panel; a rear chassis configured to support the light source module and disposed behind the light source module; a heat collection device including a first region disposed at an edge portion of the rear chassis and a second region extending toward a central portion of the rear chassis, and a heat discharge device configured to discharge heat collected in the heat collection device and disposed to correspond to the central portion.

The display apparatus may further include a light guide plate configured to guide the light generated by the light source to the display panel. The first region may collect heat generated by the light guide plate and the light source module. The second region may transfer the heat collected in the first region and discharge the heat to an outside of the heat collection device. The heat discharge device may discharge the heat discharged from the second region to an outside of the display apparatus.

The first region may be disposed behind the light source module to correspond to the light source module.

The heat discharge device may be provided behind the rear chassis and is disposed to correspond the second region behind the second region in a front-rear direction of the display apparatus.

According to an aspect of an example embodiment, a display apparatus may include a display panel on which an image is displayed in a forward direction; a housing configured to cover the display panel; a light source module including a light source configured to generate light, and disposed behind the display panel; a heat discharge device configured to discharge heat generated in the housing to an outside of the housing; and a heat collection device including a heat collection part disposed to correspond to the light source module in a front-rear direction of the housing and a discharge part extending from the heat collection part to correspond to the heat discharge device in the front-rear direction of the housing and configured to discharge heat collected in the heat collection part to the heat discharge device.

BRIEF DESCRIPTION OF THE DRAWINGS

These and/or other aspects of the disclosure will become apparent and more readily appreciated from the following description of the example embodiments, taken in conjunction with the accompanying drawings of which.

DETAILED DESCRIPTION

Figure 1:
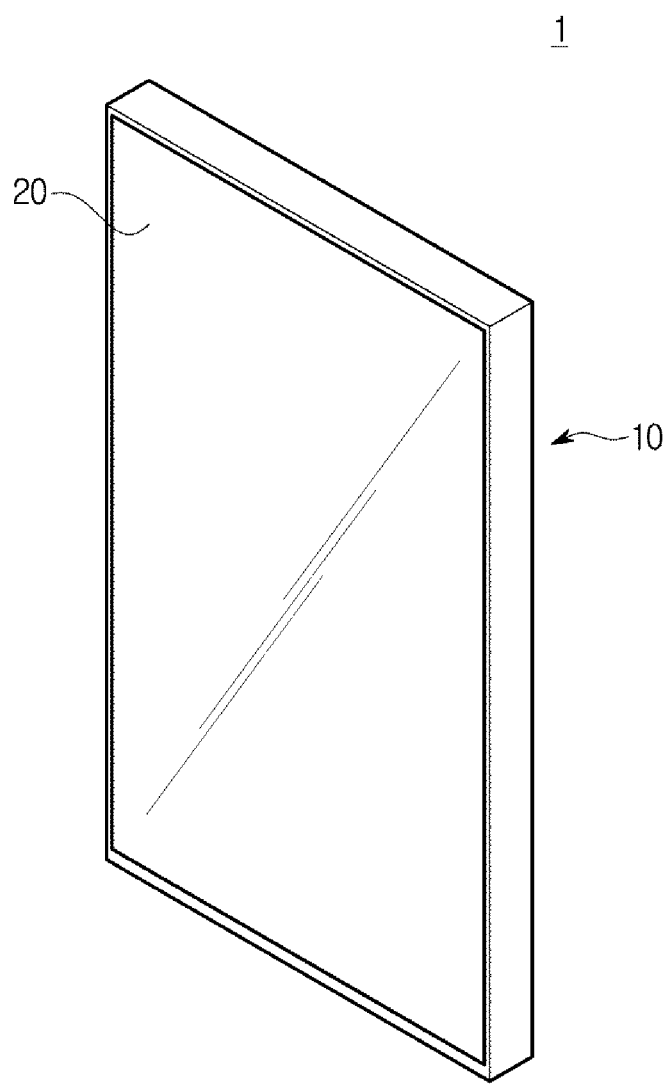
FIG. 1 is a perspective view illustrating an outdoor display device according to an example embodiment of the present disclosure.

Reference will now be made in detail to example embodiments of the present disclosure, which are illustrated in the accompanying drawings, wherein like reference numerals refer to like elements throughout.

The embodiments described herein and configurations shown in the drawings are only examples of the present disclosure, and various modifications which may replace the example embodiments and drawings in the present specification may be made at a time of filing of the present application.

In addition, identical reference numerals or symbols shown in each of the figures of the present specification indicate components or parts components that perform substantially the same function. Descriptions with respect to one example embodiment may apply to other example embodiments as well, and a feature of one example embodiment may also be implemented with another example embodiment described herein.

Further, terms used in the present specification are used to describe the example embodiments and are not intended to limit and/or to restrict the present disclosure disclosed herein. Unless clearly used otherwise, singular expressions include a plural meaning. In this specification, the terms "comprise" and/or "have" specify the presence of a stated feature, number, step, operation, component, element, or combination thereof described herein, but do not preclude the presence or addition of one or more other features, numbers, steps, operations, components, elements, or combinations thereof.

Furthermore, the terms including an ordinal number such as "first," "second," etc. used in the present specification can be used to describe various elements, but the elements are not limited by those terms. In addition, these terms are used merely for the purpose of distinguishing an element from another element. For example, a first component may be referred to as a second component, and similarly, a second component may be referred to as a first component without departing from the scope of right of the disclosure. The term "and/or" includes a combination or any one of a plurality of associated listed items.

Reference will now be made in detail to the example embodiments of the present disclosure, which are illustrated in the accompanying drawings, wherein like reference numerals refer to like elements throughout.

Although an example of a flat display apparatus 1 is described in the description of the present disclosure, the present disclosure is also applicable to a curved display apparatus or a bendable or flexible display apparatus in which a curved surface state and a flat plate state may be changed.

Further, although an example of an outdoor display apparatus 1 is described in the description of the present disclosure, the present disclosure is also applicable to a display device disposed indoors (e.g., in a room).

In addition, the terms "front side" and "front surface" used herein are based on a front surface of the display panel 30, which is a side on which the display panel 30 displays images, based on the display apparatus 1 shown in FIG. 1. Conversely, the terms "rear side" and "rear surface" used herein indicate a direction that is opposite to the direction of the "front side." On the basis of the above, "upper side" and "lower side" refer to an upper side and a lower side of the display apparatus 1 shown in FIG. 1, and "both sides" and "lateral sides" refer to left and right sides of the display apparatus 1 shown in FIG. 1.

Figure 2:
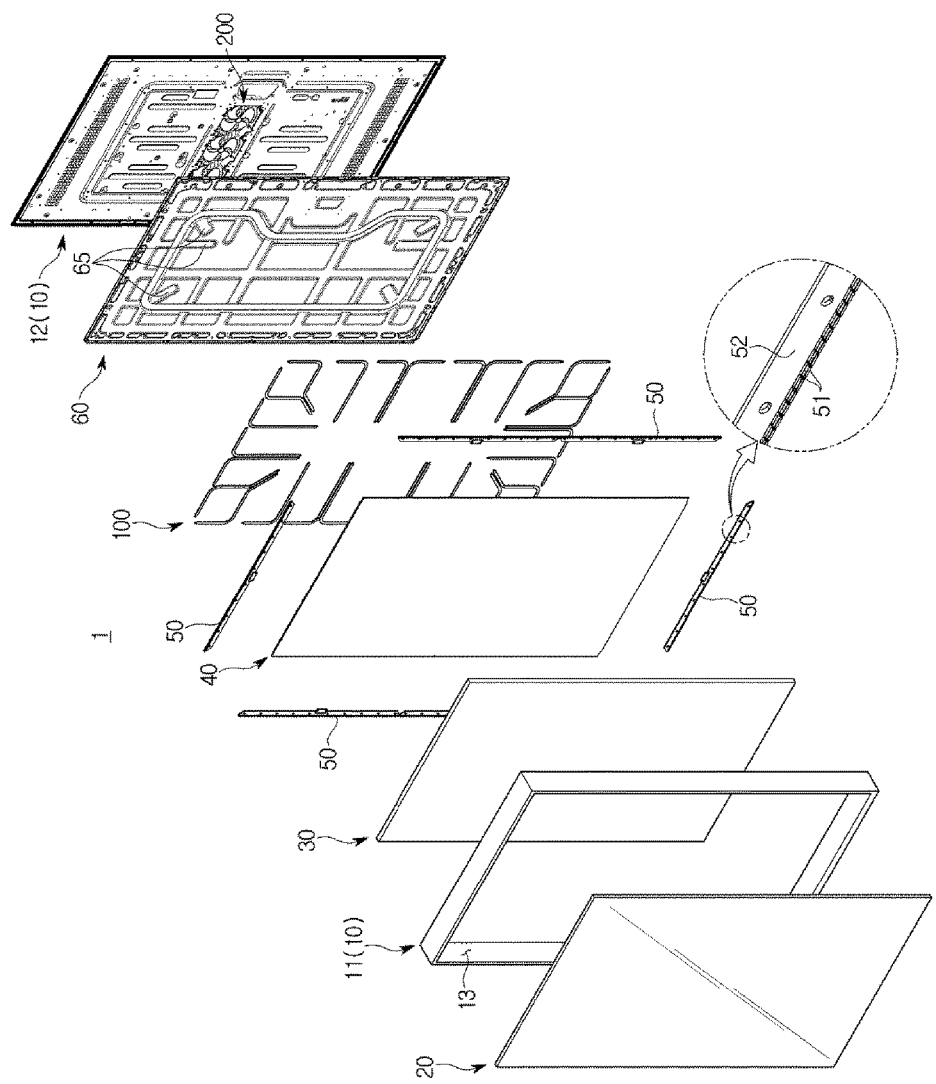
FIG. 2 is an exploded perspective view illustrating an outdoor display device according to an example embodiment of the present disclosure.
Figure 3:
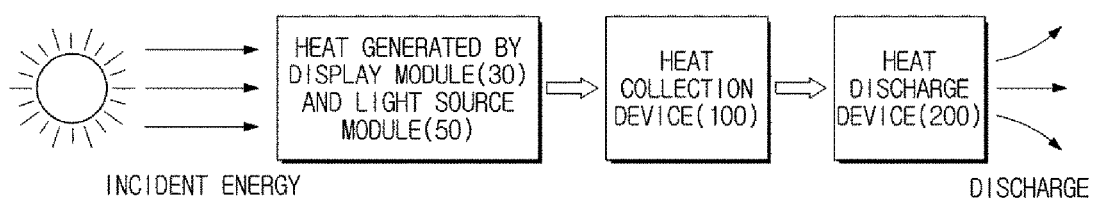
FIG. 3 is a view schematically showing movement of heat generated in an outdoor display device according to an example embodiment of the present disclosure.

FIG. 1 is a perspective view illustrating an outdoor display apparatus according to an example embodiment of the present disclosure, FIG. 2 is an exploded perspective view illustrating the outdoor display apparatus according to an example embodiment of the present disclosure, and FIG. 3 is a schematic view illustrating a flow of heat generated by the outdoor display apparatus according to an example embodiment of the present disclosure.

As shown in FIGS. 1 to 3, an outdoor display apparatus 1 may include a housing 10 forming an exterior thereof. The housing 10 may be configured to be installed outdoors. An opening 13 may be formed in a front surface of the housing 10, and an image displayed on a display panel 30 may be visible to the outside through the opening.

The housing 10 may include a first frame 11. The first frame 11 may have a box shape in which a front surface and a rear surface are open. The open front face of the first frame 11 may be defined as the opening 13. In other words, the opening 13 may be formed in the front surface of the first frame 11.

The housing 10 may further include a second frame 12. The second frame 12 may be coupled to the first frame 11. Specifically, the second frame 12 may be coupled to the open rear surface of the first frame 11 to form the exterior of the outdoor display apparatus 1 together with the first frame 11.

The outdoor display apparatus 1 may further include a protective glass 20 arranged to protect the display panel 30. The protective glass 20 may be disposed in front of the display panel 30 to protect the display panel 30. Specifically, the protective glass 20 may be coupled to the opening 13 of the housing 10.

The protective glass 20 may have a size corresponding to that of the display panel 30. Specifically, the protective glass 20 may be disposed to correspond to a display region of the display panel 30 on which an image is displayed.

The outdoor display apparatus 1 may further include the display panel 30. The display panel 30 may be disposed inside the housing 10. The display panel 30 may be disposed inside the housing 10 to be located behind the protective glass 20.

The outdoor display apparatus 1 may include a light source module 50 including a plurality of light sources 51 to generate light, and a light guide plate 40 disposed behind the display panel 30 and guiding the light generated by the light source module 50 to the display panel 30.

The light source module 50 may be disposed on four side surfaces (e.g., top, bottom, left, right) of the light guide plate 40 to radiate the light toward the side surfaces of the light guide plate 40. However, the present disclosure is not limited to one embodiment, and the light source module 50 may be disposed on at least one of the four side surfaces of the light guide plate 40.

As described above, the outdoor display apparatus 1 according to an example embodiment of the present disclosure will be described with reference to an edge-type display apparatus. However, the outdoor display apparatus 1 according to an example embodiment of the present disclosure may be applied to a direct-type display apparatus, and the direct-type display apparatus will be described with reference to an outdoor display apparatus according to an example embodiment of the present disclosure.

The outdoor display apparatus 1 may include a rear chassis 60 supporting the light source module 50. The rear chassis 60 is disposed behind the light guide plate 40 and may support the light guide plate 40 and the light source module 50 together therewith.

A screen may be provided on the display panel 30. The display panel 30 may display various images on the screen in response to an image signal input from the outside. At this time, the display panel 30 may be any one of a light emitting display panel in which a plurality of pixels constituting the display panel 30 generate light by themselves to generate an image and a non-light emitting display panel in which a plurality of pixels reflect/transmit/block light to generate an image. Below, the display panel will be described under the assumption that the display panel 30 is a non-light emitting display panel in which an image is generated by reflecting/transmitting/blocking light radiated from the light source module 50.

The display panel 30 may include a liquid crystal layer, a transparent electrode layer, a transparent substrate, and a color filter.

An appropriate amount of liquid crystals may be provided in the liquid crystal layer. Here, the liquid crystal refers to a substance in an intermediate state between a crystal and a liquid. The above-described liquid crystal may exhibit optical properties according to a change in voltage. For example, an orientation direction of molecules constituting the liquid crystals may be changed depending on a change of an electric field applied to the liquid crystals.

A pair of transparent electrode layers for forming a changing electric field in the liquid crystal layer may be provided on both sides of the liquid crystal layer. The electric field applied to the liquid crystal layer may be changed depending on a voltage input between the pair of transparent electrode layers. The above-described transparent electrode layer may include a gate line, a data line, and a thin-film transistor (TFT).

A pair of transparent substrates form an exterior of the display panel 30 and protect the liquid crystal layer and the transparent electrode layer. Such a transparent substrate may be composed of a tempered glass or a transparent film having high optical transmittance.

The color filter may include a red filter, a blue filter, and a green filter formed on each of regions corresponding to a plurality of pixels constituting the display panel 30 so that a color is displayed for each of the pixels.

As described above, the display panel 30 may block or transmit light generated by the light source module 50 to form an image. Specifically, various colored images may be generated by blocking or transmitting light of a backlight unit 38 using each of the pixels constituting the display panel 30.

The light source module 50 may include the plurality of light sources 51 for generating light, as described above. The plurality of light sources 51 are light emitting elements. The plurality of light sources 51 may include all elements or devices that generate and emit light in addition to a light emitting diode (LED).

The light source module 50 may include a bar-shaped circuit board 52 on which the plurality of light sources 51 are arranged. The circuit board 52 may include at least one of a printed circuit board (PCB) and a flexible circuit board (flexible copper clad laminate).

The plurality of light sources 51 may be arranged on the circuit board 52 to radiate light toward the side surface of the light guide plate 40.

The circuit board 52 may be disposed on the rear chassis 60. A conductive pattern may be formed on the circuit board 52. The plurality of light sources 51 and the circuit board 52 may be electrically connected to each other through a wire bonding method, a flip chip bonding method, or the like.

The outdoor display apparatus 1 may further include a front chassis disposed in front of the display panel 30 and coupled to the rear chassis 60, a middle mold disposed between the front chassis and the rear chassis 60 to support the display panel 30, an optical sheet disposed behind the display panel 30, a diffusion sheet disposed behind the light guide plate 40, and the like.

Sunlight incident on the front surface of the outdoor display apparatus 1 may raise a temperature of the display panel 30. In addition, the light source module 50 disposed to supply light to the display panel 30 may also functions as a heating element and raise an internal temperature of the housing 10.

When the internal temperature of the housing 10 is increased, the temperature of the display panel 30 may also increase. Excessive heating of the display panel 30 may cause deterioration of the display panel 30. In order to prevent deterioration of the display panel 30, a conventional outdoor display apparatus is provided with a cooling device for dissipating heat generated by a light source. The cooling device has a structure including a fan, an air filter, and the like, and is configured to suction outside air using the fan, form a cooling flow path for cooling an entire surface of a liquid crystal panel, and absorb and discharge solar heat and heat of the liquid crystal panel through the cooling channel.

A heat dissipation device provided with such a fan and air filter has problems in that the air filter should be periodically replaced, which causes a high maintenance cost, and, since the fan, the air filter, and the flow path should be disposed inside the display apparatus, a thickness of the product is increased by as much as a thickness of the fan and air filter.

Particularly, a conventional display apparatus has a problem in that, since a flow path thereof is formed throughout an entire inside of a housing thereof, a cooling device is also connected to a configuration in which no heat is substantially generated, and thus the cooling device is constructed to be large and cooling efficiency thereof is lowered.

Accordingly, the outdoor display apparatus 1 according to one embodiment of the present disclosure may include a heat collection device 100 including a heat collection part configured to collect heat from a region at which a large amount of heat is substantially generated in the housing 10 and a discharge part configured to discharge heat after transferring the heat collected in the heat collection part to a region at which a large amount of heat is not generated.

In addition, the outdoor display apparatus 1 may include a heat discharge device 200 configured to discharge the heat discharged from the heat collection device to the outside of the outdoor display apparatus 1.

Accordingly, the heat collection device 100 may be configured such that the heat collection part is selectively disposed on a region at which a large amount of heat is generated in the outdoor display apparatus 1 so that the cooling structure of the outdoor display apparatus 1 may be simplified and the cooling efficiency may increase.

In other words, as shown in FIG. 3, in the outdoor display apparatus 1 according to one example embodiment of the present disclosure, incident energy introduced into the outdoor display apparatus 1 by sunlight raises a temperature of the display panel 30 and causes deterioration of the liquid crystal of the display panel 30, and light is generated by the light source module 50, which generates heat in the light source module 50 itself and raises a temperature thereof.

In addition, heat may be generated by a PCB constituting a controller for driving the outdoor display apparatus 1 and raise a temperature thereof.

As described above, the heat collection device 100 is formed at a location corresponding to a location of a structure at which a temperature is raised in the outdoor display apparatus 1, and thus it is possible to collect heat generated by the display panel 30 and the light source module 50.

Specifically, the heat collection part 110 (see FIG. 4) of the heat collection device 100 may be disposed to correspond with a location at which the display panel 30 and the light source module 50, which are heat generating elements, are disposed to absorb the heat, and the heat collected in the heat collection part 110 may be transferred to the discharge part 120 (see FIG. 5), which is connected to the heat collection part 110, to be discharged to the outside of the heat collection device 100.

The heat discharged to the outside of the heat collection device 100 may be discharged to the outside of the outdoor display apparatus 1 by the heat discharge device 200. Accordingly, the inside of the outdoor display apparatus 1 may be cooled to prevent a malfunction of the outdoor display apparatus 1 caused by deterioration of the display panel 30.

The heat collection device 100 and the heat discharge device 200 of the outdoor display apparatus 1 according to one example embodiment of the present disclosure will be described in detail below.

Figure 4:
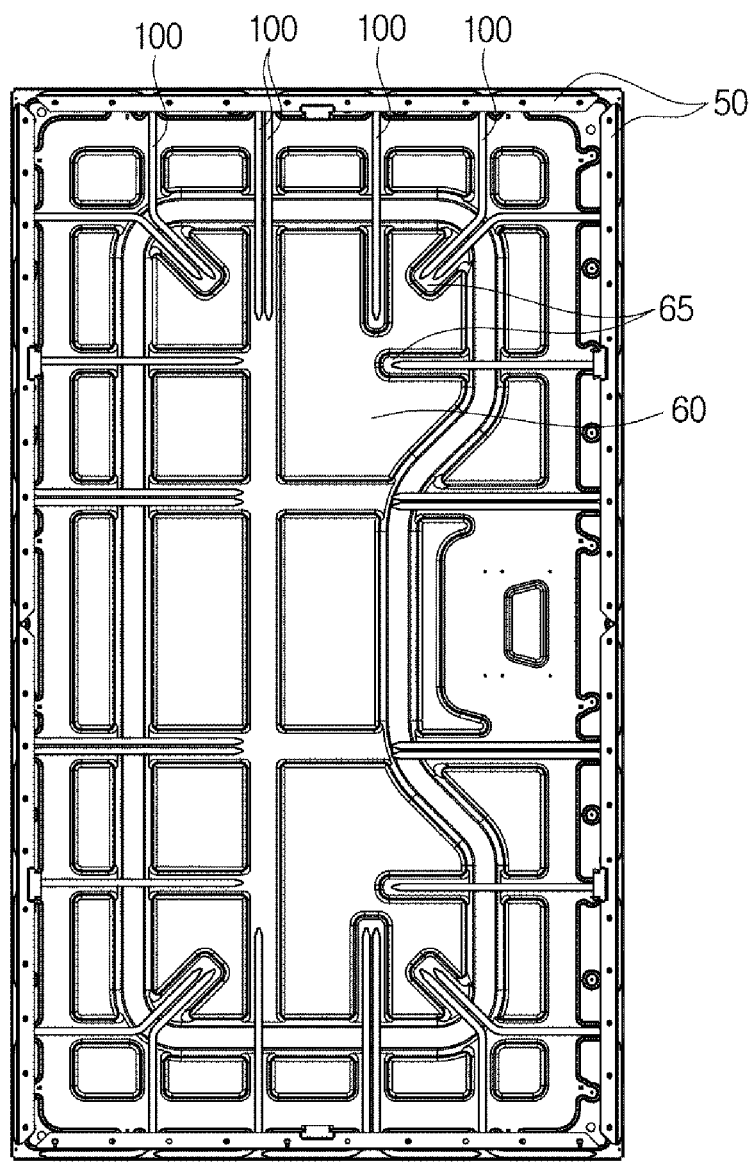
FIG. 4 is a front view of a part of the configuration of the outdoor display device according to an example embodiment of the present disclosure.
Figure 5:
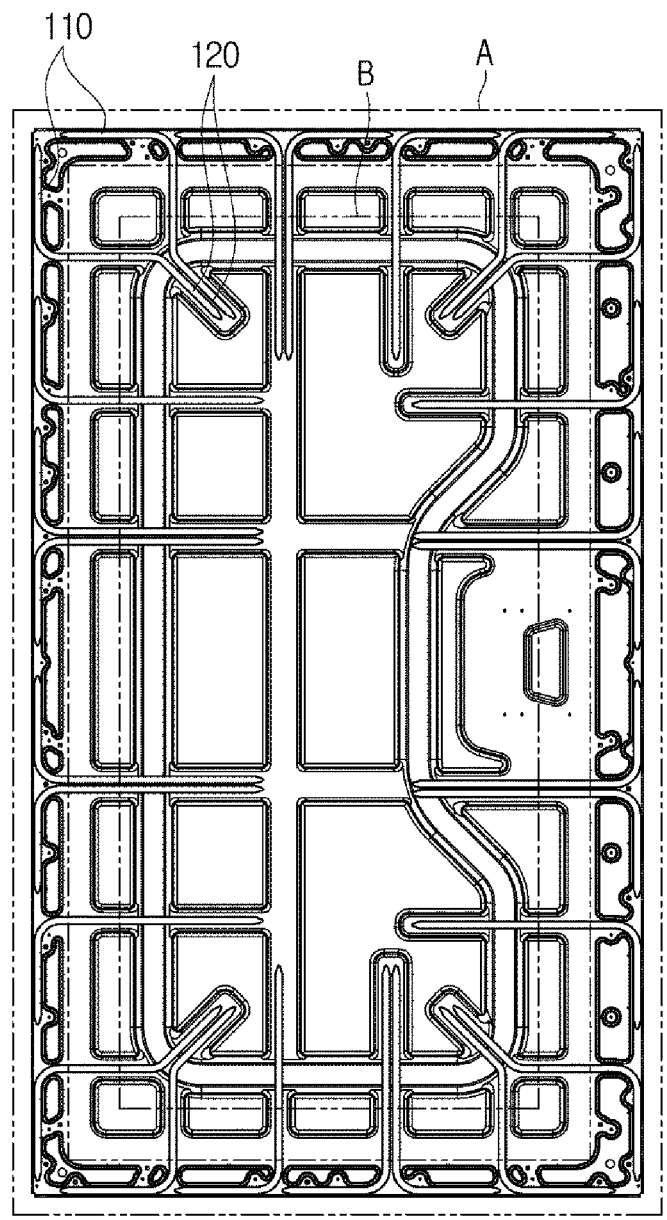
FIG. 5 is a front view of a state in which the light source module is removed.

FIG. 4 is a front view of a part of a configuration of the outdoor display apparatus according to one example embodiment of the present disclosure, FIG. 5 is a front view illustrating a state in which the light source module in FIG.

Figure 6:
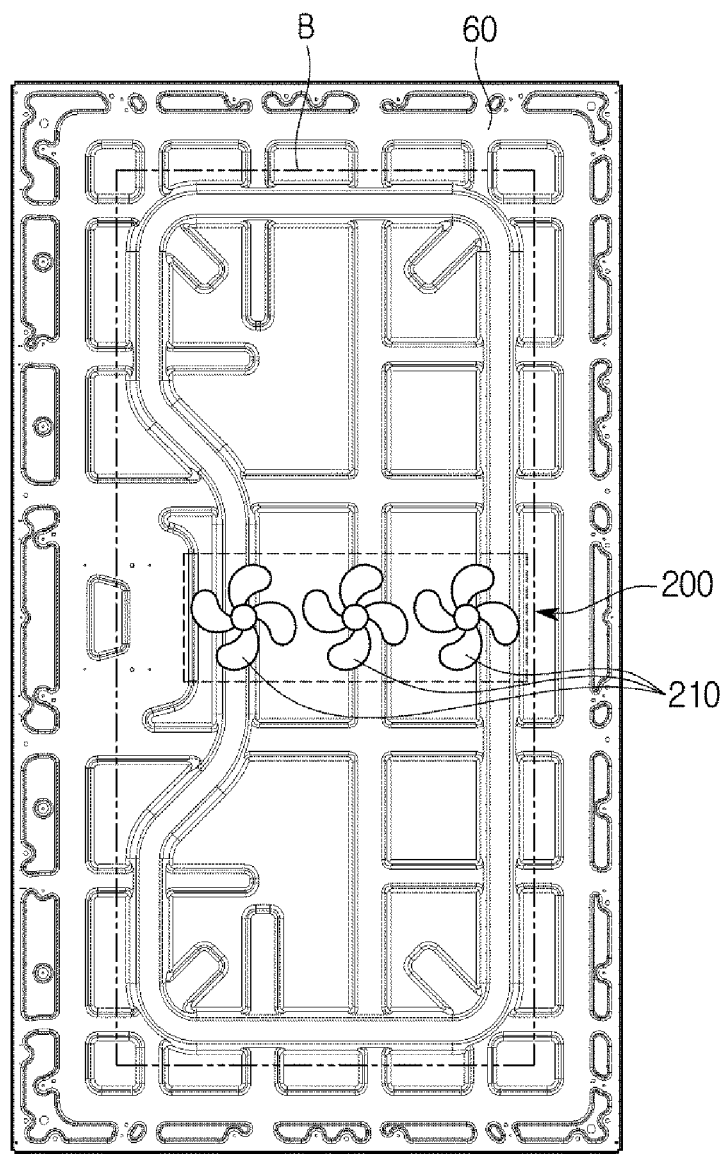
FIG. 6 is a rear view of a rear chassis and a heat discharging device of an outdoor display device according to an example embodiment of the present disclosure.
Figure 7:
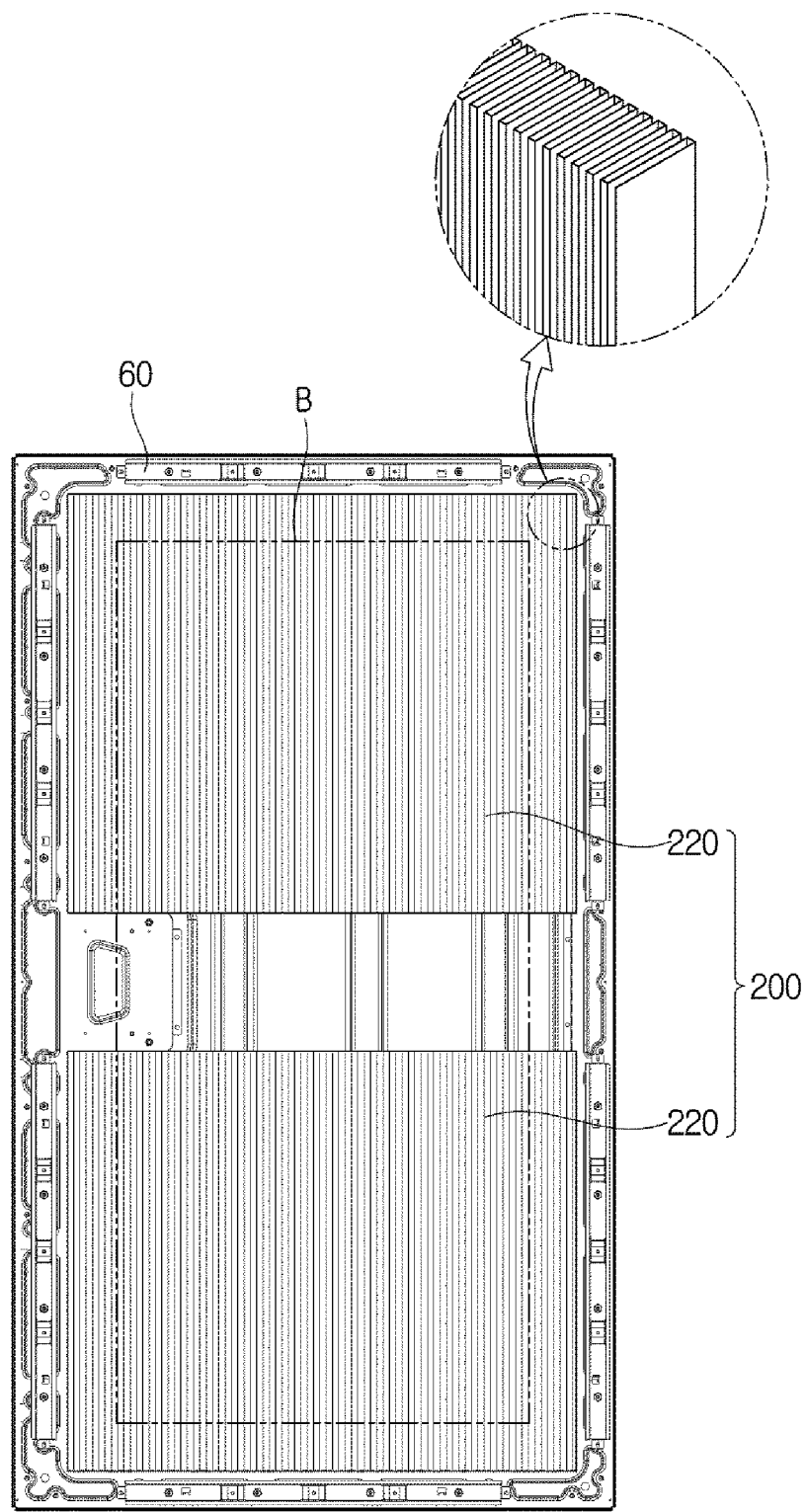
FIG. 7 is a rear view of a rear chassis and a heat discharging device of an outdoor display device according to an example embodiment of the present disclosure.
Figure 8:
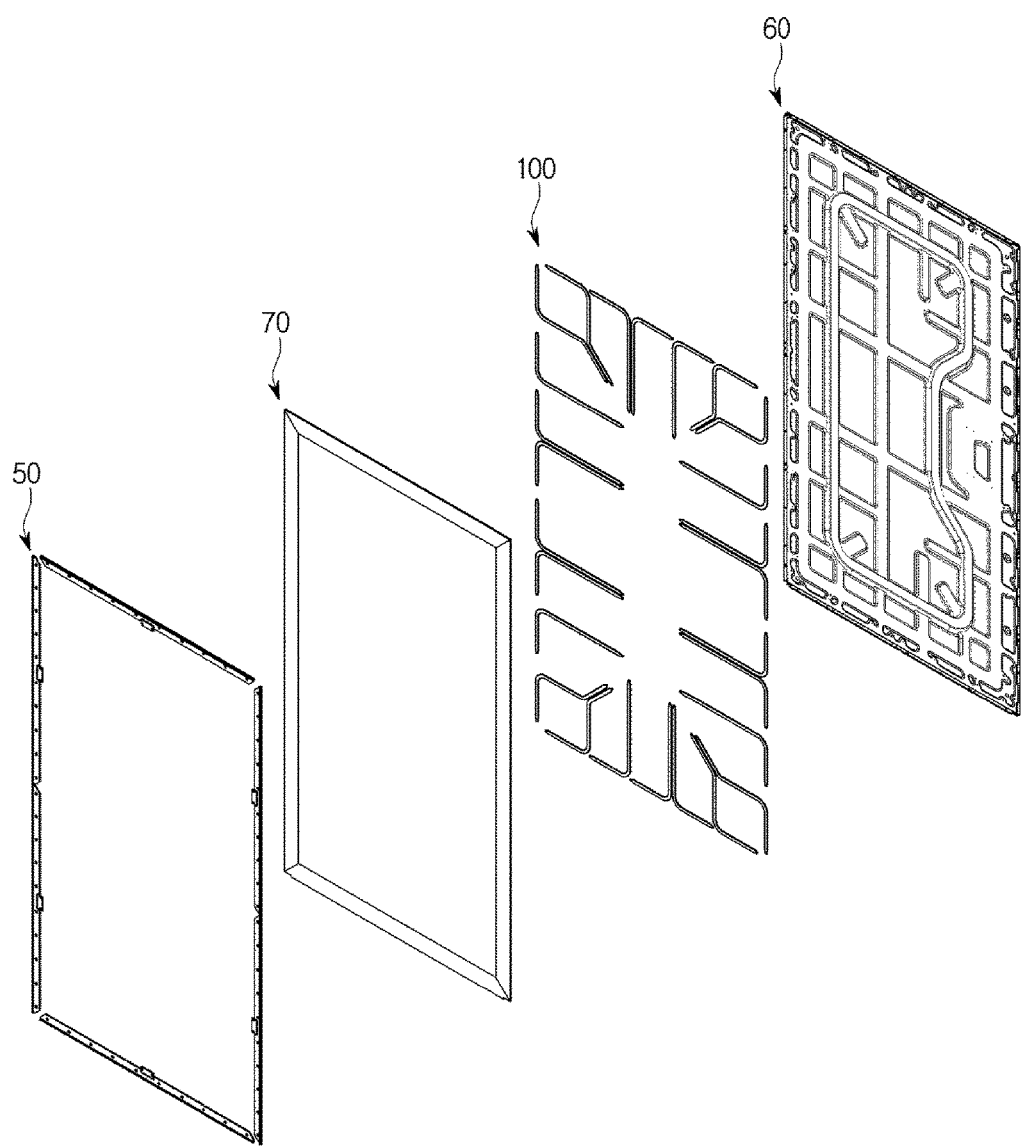
FIG. 8 is an exploded perspective view of a part of the configuration of an outdoor display device according to an example embodiment of the present disclosure.

4 is removed, FIG. 6 is a rear view of the rear chassis and the heat discharge device of the outdoor display apparatus according to one example embodiment of the present disclosure, FIG. 7 is a rear view of the rear chassis and the heat discharge device of an outdoor display apparatus according to an example embodiment of the present disclosure, and FIG. 8 is an exploded perspective view of a part of a configuration of the outdoor display apparatus according to an example embodiment of the present disclosure.

As shown in FIG. 4, the heat collection device 100 and the light source module 50 may be supported by the rear chassis 60. The plurality of heat collection devices 100 may be provided and seated in seating grooves 65 formed on a front surface of the rear chassis 60 to be supported by the rear chassis 60.

One of the plurality of heat collection devices 100 will be described below for convenience of description. One heat collection device 100 described below may be applied to all the plurality of heat collection device 100.

The light source module 50 may also be supported by the rear chassis 60, but the light source module is not limited thereto and may be supported by a middle mold.

As described above, the light source module 50 is composed of four light source modules to radiate light toward the four side surfaces of the light guide plate 40, and is disposed to correspond to the side surfaces of the light guide plate 40, as shown in FIG. 4. Therefore, the light source module may be disposed at a front surface of an edge side of the rear chassis 60. That is, the light source modules 50 may be disposed on the front surface of the edge side of the rear chassis 60.

As illustrated in FIG. 5, the heat collection device 100 may include the heat collection part 110 disposed at a location corresponding to the light source module 50 in a front-rear direction (e.g., direction orthogonal to the front surface) of the outdoor display apparatus 1, and the discharge part 120 bent and extending from the heat collection part 110

In other words, the heat collection device 100 may include the heat collection part 110 arranged at an edge portion side of the rear chassis 60 and the discharge part 120 bent at the edge side and extending to a central portion side of the rear chassis 60.

The heat collection device 100 is provided in the form of a metal tube, and an inside of the metal tube may be filled with a coolant to allow heat to be transferred from the heat collection part 110 to the discharge part 120 by the coolant.

The heat collection device 100 may include a heat pipe. When an inside of a main body formed of the metal tube is filled with a working fluid and heat is generated at a first region, which is one end side of the heat pipe, the working fluid in the heat pipe may evaporate to transfer the heat with thermal energy to a second region, which is the other end side, to which no heat is applied.

The evaporated working fluid transferred to the second region releases heat, is condensed in the second region, and is moved back to the first region in a liquid state so that it is possible to cyclically transfer heat.

That is, the heat collection part 110 of the heat collection device 100 may correspond to the first region of the heat pipe, and the second region of the heat pipe may correspond to the discharge part 120 of the heat collection device 100. Accordingly, as shown in FIG. 5, a plurality of heat pipes may constitute the heat collection device 100, the first region in the plurality of heat pipes to which heat is transferred may form the heat collection part 110 of the heat collection device 100, and the second region to which the transferred heat is transferred may form the discharge part 120 of the heat collection device 100.

Hereinafter, this example embodiment will be described under the assumption that the heat collection device 100 has a configuration corresponding to the plurality of heat pipes, the heat collection part 110 of the heat collection device 100 has a configuration corresponding to the first region of the plurality of heat pipes, and the discharge part 120 has a configuration corresponding to the second region of the plurality of heat pipes.

On the contrary, the first region of the heat collection device 100 may be referred to as the heat collection part 110 and the second region of the heat collection device 100 may be defined as the discharge part 120.

In the display panel 30 in which heat is generated, the heat is generated throughout an entire area of the display panel 30, and the heat generated throughout the entire area of the display panel 30 may be transferred to a configuration such as the light guide plate 40 or the like which is disposed behind the display panel 30.

Accordingly, heat generated by the display panel 30 may generally be uniformly transferred to an entire surface of the rear chassis 60. However, heat generated by the light source module 50 is directly transferred to the edge portion side of the rear chassis 60 on which the light source module 50 is supported, and thus heat with a temperature higher than that of a central portion of the rear chassis 60 at which the light source module 50 is not disposed may be transferred to the edge portion of rear chassis 60.

Therefore, a high-temperature heat region A may be formed at the edge portion of the rear chassis 60, and a low-temperature heat region B may be formed at the central portion of the rear chassis 60. As a result, by disposing the heat collection part 110 at the edge portion or the high-temperature heat region A of the rear chassis 60, it is possible to effectively collect heat generated by the outdoor display apparatus 1.

Further, the discharge part 120 may extend from the heat collection part 110 to be disposed in the low-temperature heat region B. Heat collected in the heat collection part 110 may be transferred to the low-temperature heat region B by the discharge part 120 to easily cool the high-temperature heat region A.

That is, the heat collection part 110 of the heat collection device 100 is disposed on a region of the outdoor display apparatus 1 at which heat is intensively generated to absorb the heat, the heat is transferred to the low-temperature heat region B in which heat with a temperature lower than that of the high-temperature heat region A is generated to effectively cool the high-temperature heat region A, and the heat may be uniformly distributed over the entire surface of the rear chassis 60, and thus it is possible to prevent a malfunction of the outdoor display apparatus 1 due to high heat.

In other words, the edge portion of the rear chassis 60 may be defined as a collection region A of the rear chassis 60 in which the heat collection device 100 collects heat transferred to the rear chassis 60, and the central portion of the rear chassis 60 may be defined as a heat collection region B to which the heat collected in the heat collection part 110 is transferred and concentrated.

That is, the collection region A is a region in the rear chassis 60 to which heat is intensively transmitted by the light source module 50 and the display panel 30. Accordingly, high heat transmitted to the rear chassis 60 is collected in the heat collection device 100 by the heat collection part 110.

Further, the heat collection region B is a region on which the discharge part 120, to which the heat collected in the heat collection part 110 is transferred, is placed. Accordingly, the heat of the heat collection device 100 discharged by the discharge part 120 is collected in the rear chassis 60 at this heat collection region B.

In order to reduce a temperature deviation of internal optical components and light source parts in the display, the heat collection devices 100 such as heat pipes or liquid cooling refrigerant flow paths used for collecting heat (to be described in an example embodiment below) may be arranged on the rear chassis 60 at an interval of 10 mm to 200 mm and in a specific form with an angle between 45° and 90° and a straight line on about same plane.

In addition, the heat collection device 100 such as the heat pipe or liquid cooling flow path is disposed in a shape directed from the edge portion of the rear chassis 60 toward the central portion thereof, and one heat collection device or a plurality of heat collection devices may be mounted on the rear chassis 60 to maintain performance irrespective of an installation direction of the display.

As shown in FIG. 6, the heat discharge device 200 configured to discharge heat discharged from the discharge part 120 to the outside of the outdoor display apparatus 1 may be provided in the low-temperature heat region B in which the discharge part 120 is disposed.

The heat discharged from the discharge part 120 is collected in the low-temperature heat region B of the rear chassis 60, and the heat collected in the low-temperature heat region B may be discharged to the outside of the outdoor display apparatus 1 through the heat discharge device 200.

Specifically, the heat discharge device 200 may be disposed to correspond to a location of the discharge part 120 in the front-rear direction of the outdoor display apparatus 1. The discharge part 120 may be provided at the central portion of the front surface of the rear chassis 60, and the heat discharge device 200 may be disposed at a central portion of a rear surface of the rear chassis 60.

In other words, the heat discharge device 200 may be disposed with the discharge part 120 in the low-temperature heat region B. This is for directly discharging heat discharged by the discharge part 120 to the outside of the outdoor display apparatus 1 through the low-temperature heat region B of the rear chassis 60.

The heat discharge device 200 may include one or more blowing fans 210. The blowing fan 210 may discharge heat discharged by the discharge part 120 to the outside of the outdoor display apparatus due to rotation of the fan.

A discharge port provided for discharging a discharge-air flow formed by the blowing fan 210 to the outside may be disposed on the second frame 12 disposed behind the rear chassis 60. The discharge port may be disposed to correspond to a location of the blowing fan 210 in the front-rear direction of the outdoor display apparatus 1.

Accordingly, since the discharge part 120, the blowing fan 210 and the discharge port are disposed to correspond to each other in the front-rear direction of the outdoor display apparatus 1, it is possible to directly discharge heat discharged from the discharge part 120 to the outside of the outdoor display apparatus 1.

Although not shown in the drawings, a thermoelectric element module may be disposed between the rear chassis 60 and the blowing fan 210 to effectively transmit the heat discharged from the discharge part 120.

One surface of the thermoelectric element module (not shown) is disposed adjacent to the low-temperature heat region B of the rear surface of the rear chassis 60 so that heat transmitted to the low-temperature heat region B by the discharge part 120 may be effectively collected and the collected heat may be transferred to the other surface.

The other surface of the thermoelectric module is disposed adjacent to the blowing fan 210 so that heat discharged from the other surface may be effectively discharged to the outside of the outdoor display apparatus 1.

Hereinafter, the heat discharge device 200 of the outdoor display apparatus 1 according to an example embodiment of the present disclosure will be described. Configurations except the heat discharge device 200 that will be described below are identical to those of the outdoor display apparatus 1 according to one example embodiment of the present disclosure, and thus overlapping descriptions of the same configurations will be omitted.

FIG. 7 is a rear view of a rear chassis and a heat discharge device of an outdoor display apparatus according to an example embodiment of the present disclosure. The heat discharge device 200 according to an example embodiment of the present disclosure may include one or more heat exchange fins 220 that exchange heat with air outside the outdoor display apparatus 1.

The heat exchange fin 220 may be provided to correspond to the low-temperature heat region B of the rear surface of the rear chassis 60. Heat transferred to the low-temperature heat region B by the discharge part 120 may be transferred to the outside of the outdoor display apparatus 1 by natural convection through the heat exchange fin 220.

Accordingly, an additional configuration configured to drive the blowing fan 210, as in one example embodiment of the present disclosure, may be unnecessary.

An opening may be provided in the second frame 12 such that the heat exchange fin 220 may easily exchange heat with the air outside the outdoor display apparatus 1.

The opening may have a size corresponding to that of the heat exchange fin 220 to allow at least a part of the heat exchange fin 220 to be exposed to the outside of the second frame 12. Alternatively, a plurality of openings may be provided in an entire area of the second frame 12 to allow natural convection between high-temperature heat and outside air to be performed therethrough even when the heat exchange fin 220 is not exposed to the outside.

Hereinafter, a heat conduction member 70 of the outdoor display apparatus 1 according to an example embodiment of the present disclosure will be described. Configurations that do not include the heat conduction member 70 as described below are identical to those of the outdoor display apparatus 1 according to an example embodiment of the present disclosure, and thus overlapping descriptions of the same configurations will be omitted.

FIG. 8 is an exploded perspective view of a part of a configuration of the outdoor display apparatus according to an example embodiment of the present disclosure. The outdoor display apparatus 1 according to an example embodiment of the present disclosure may include a heat conduction member 70 disposed between the heat collection device 100 and an light source module 50.

The heat conduction member 70 may be formed of a thermally conductive material having high conductivity. The heat conduction member 70 may rapidly transfer heat generated by the display panel 30 and the light source module 50 to the heat collection device 100. In addition, the heat conduction member 70 may transfer heat in the heat collection device 100, which is cooled by the heat discharge device 200, to the display panel 30 and the light source module 50 again.

Accordingly, when the heat conduction member 70 is disposed between the light source module 50 and the heat collection device 100, it is possible to discharge heat in the outdoor display apparatus 1 more rapidly and to cool the display panel 30 and the light source module 50 more rapidly.

Hereinafter, an outdoor display apparatus 1' according to an example embodiment of the present disclosure will be described. The outdoor display apparatus 1' that will be described below is a direct type display apparatus.

Other than the configuration of the outdoor display apparatus 1' that will be described below, the remaining configurations are identical to those of the outdoor display apparatus 1 according to an example embodiment of the present disclosure. Accordingly, overlapping descriptions of the same configurations will be omitted.

Figure 9:
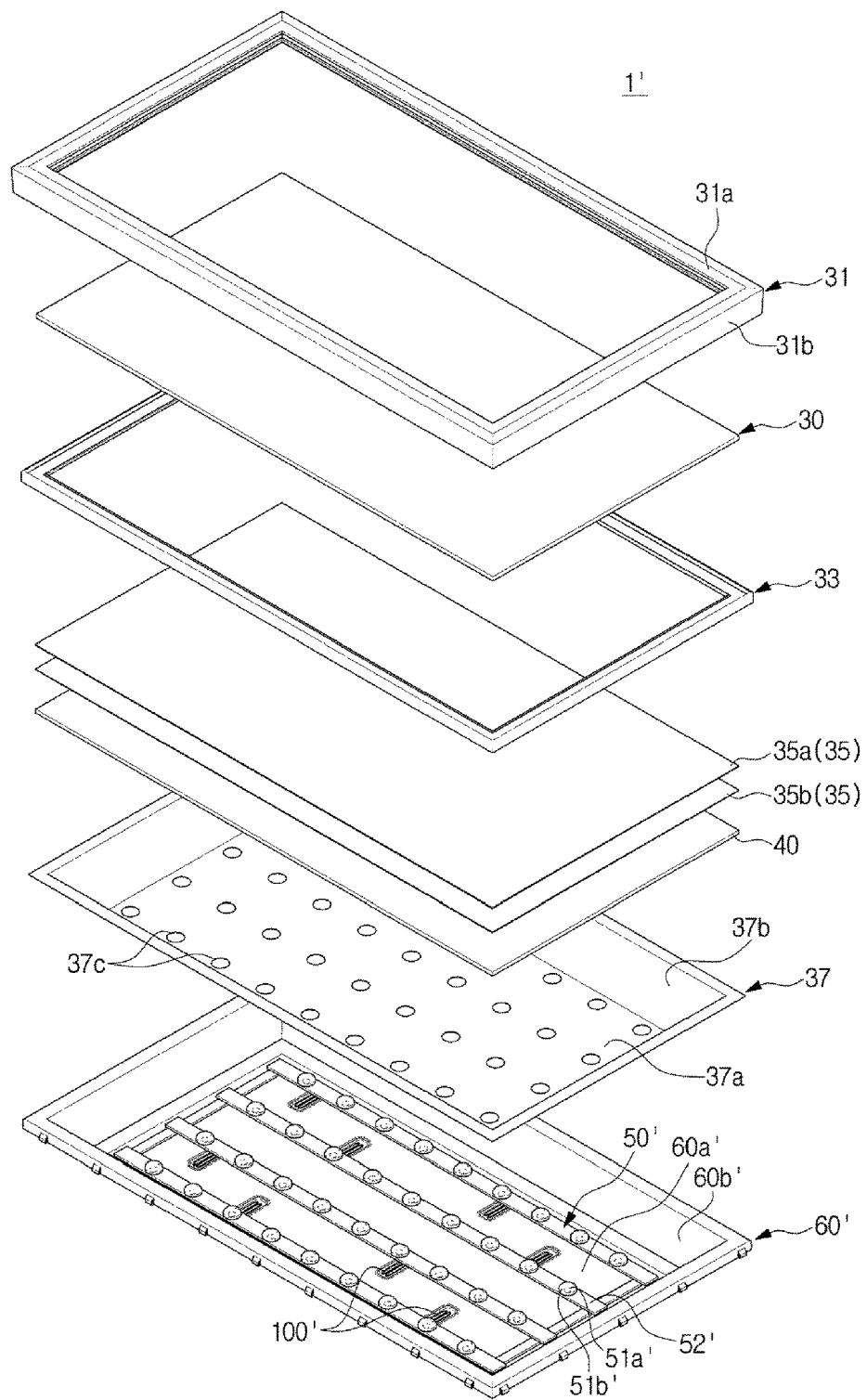
FIG. 9 is an exploded perspective view of an outdoor display device according to an example embodiment of the present disclosure.
Figure 10:
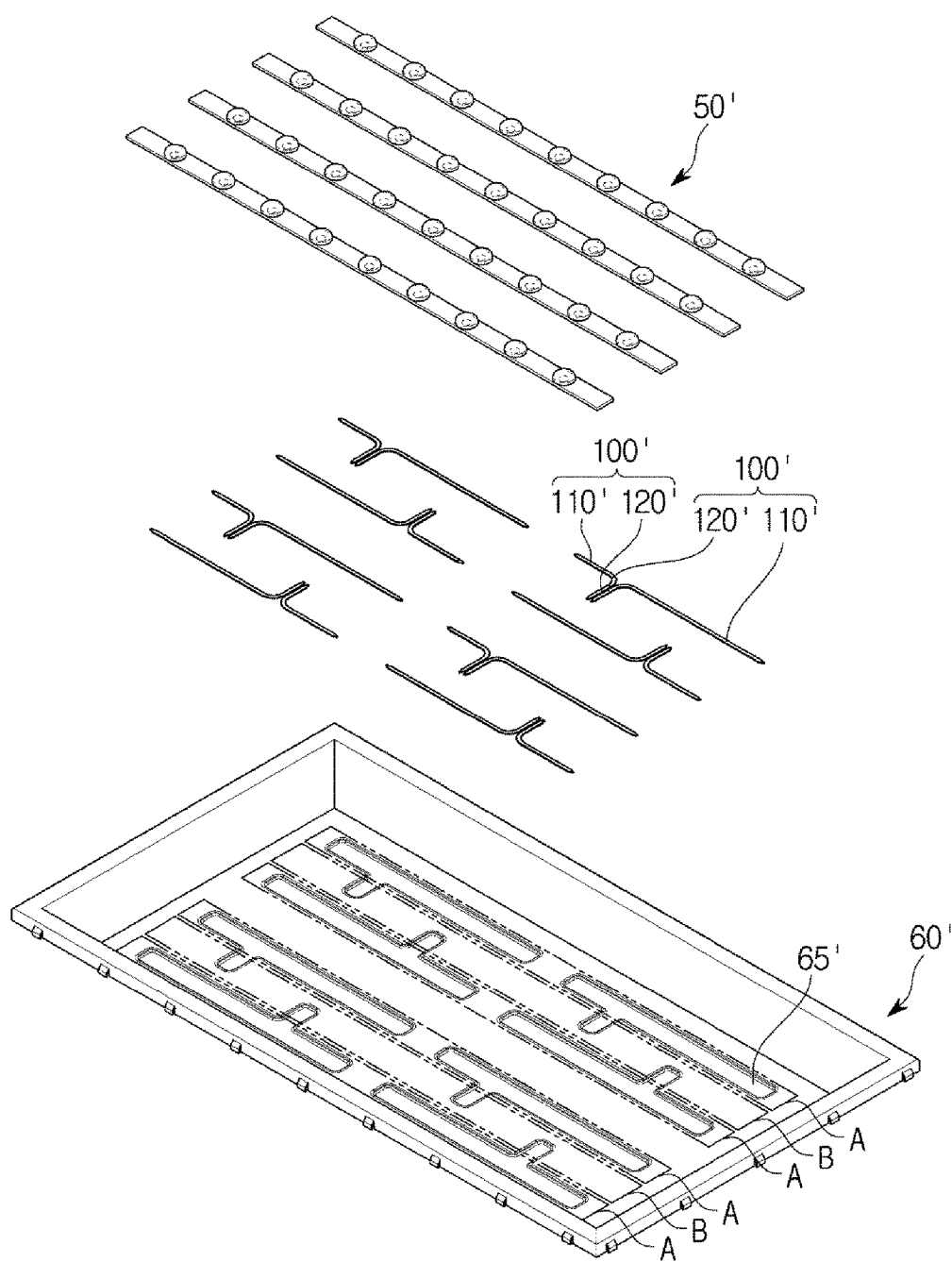
FIG. 10 is an exploded perspective view of a part of the configuration of an outdoor display device according to an example embodiment of the present disclosure.

FIG. 9 is an exploded perspective view of an outdoor display apparatus according to an example embodiment of the present disclosure, and FIG. 10 is an exploded perspective view of a part of an outdoor display apparatus according to an example embodiment of the present disclosure.

As illustrated in FIG. 9, the outdoor display apparatus 1' may include a front chassis 31 forming a front exterior thereof, a rear chassis 60' forming a rear exterior thereof, and a middle mold 33 provided between the front chassis 31 and the rear chassis 60'.

The front chassis 31 is provided to be coplanar with a display panel 30 on which an image is displayed so that an edge portion of the display panel 30 is not exposed to the outside. The front chassis 31 may include a bezel portion 31a covering a front edge portion of the display panel 30 and a top side portion 31b bent backward from an edge of the bezel portion 31a.

The rear chassis 60' may be provided on a surface opposite the display panel 30. In addition, the rear chassis 60' may protect various components in the outdoor display apparatus 1' from an external impact. A light source module 50' may be installed on the rear chassis 60'.

The rear chassis 60' may be formed in an approximately rectangular shape. However, the shape of the rear chassis 60' is not limited to the rectangular shape. The rear chassis 60' may include a bottom rear surface portion 50a' on which the light source module 50' is mounted and a bottom side surface portion 50b' extending forward from an edge of the bottom rear surface portion 50a'. A seating groove may be formed to be concave on the bottom rear surface portion 50a' to allow a circuit board 52' of the light source module 50' to be seated thereon.

The middle mold 33 may be provided to support the display panel 30 and a light diffusion plate 36. The middle mold 33 may support the display panel 30 disposed in front of the middle mold 33 and the light diffusion plate 36 disposed behind the middle mold 33. The front chassis 31 may be installed in front of the middle mold 33 to maintain a state in which the display panel 30 is installed on the middle mold 33. The rear chassis 60' may be installed behind the middle mold 33.

A plurality of light sources 51a' of the light source module 50' may be installed on a front surface of the circuit board 52' to face the light diffusion plate 36. In addition, the plurality of light sources 51a' may radiate light toward the display panel 30.

In addition, the light source module 50' may further include a plurality of lenses 51b' that individually surround the plurality of light sources 51a'. The plurality of lenses 51b' may be provided on the plurality of light sources 51a' to diffuse light generated by the plurality of light sources 51a'. The plurality of lenses 51b' may be formed in a circular shape, but the shape of the plurality of lenses 51b' may be variously modified. The plurality of lenses 51b' may be formed of a resin material having light transmittance. As one example, the plurality of lenses 51b' may be formed of polycarbonate (PC), polymethyl methacrylate (PMMA), an acrylic, or the like. A material for forming the plurality of lenses 51b' is not limited to the above examples, and the plurality of lenses 51b' may be formed of various materials such as a glass material or the like.

The light source module 50' may include a plurality of circuit boards 52' disposed apart from and parallel to each other. The plurality of light sources 51a' and the plurality of lenses 51b' provided on the plurality of light sources 51a' may be disposed on each of the plurality of circuit boards 52' to be apart from each other in a longitudinal direction of the plurality of circuit boards 52'.

In addition, the outdoor display apparatus 1' may further include a reflective sheet 37 disposed behind the circuit board 52'. The reflective sheet 37 may be disposed on an inner surface of the rear chassis 60'. The reflective sheet 37 may reflect light radiated toward the inner surface of the rear chassis 50' toward the display panel 30 side.

The reflective sheet 37 may include a sheet rear surface portion 37a disposed on an inner surface of a bottom rear surface portion 60a' forming a rear surface of the rear chassis 60', and a sheet side surface portion 37b extending forward from an edge of the sheet rear surface portion 37a.***

Through holes 37c may be formed in the sheet rear surface portion 37a. Specifically, the through holes 37c may be provided on the sheet rear surface portion 37a to correspond to the plurality of light sources 51a' and the plurality of lenses 51b'. The plurality of light sources 51a' and the plurality of lenses 51b' may protrude toward an inner side of the reflective sheet 37 through the through holes 37c. Accordingly, light generated by the plurality of light sources 51a' is transmitted to the display panel 30 disposed in front of the light source, and light reflected backward by the light diffusion plate 36 and the like is reflected forward by the reflective sheet 37 again.

The sheet side surface portion 37b extends forward from the edge of the sheet rear surface portion 37a, that is, upper, lower, left and right ends of the sheet rear surface portion 37a, and is obliquely formed to face a rear surface of the display panel 30 so that forward light transmitted from the plurality of light sources 51a' may be reflected. Since the light diffusion plate 36 is disposed behind the display panel 30, the sheet side surface portion 37b may be obliquely formed to face a rear surface of the light diffusion plate 36.

The outdoor display apparatus 1' may further include the light diffusion plate 36 provided to allow light emitted from the light source module 50' to be diffused and transferred to the display panel 30. The light diffusion plate 36 may be disposed at the rear of the display panel 30.

In addition, the outdoor display apparatus 1' may further include an optical sheet 35 disposed on a front surface of the light diffusion plate 36. The optical sheet 35 may be seated on the front surface of the light diffusion plate 36. The optical sheet 35 may include a prism film 35b configured to concentrate the light diffused by the light diffusion plate 36 in a direction perpendicular to the display panel 30. The optical sheet 35 may further include a protective film 35a for protecting the prism film 35b. The protective film 35a may be provided on a front surface of the prism film 35b. The protective film 35a protects various components included in the backlight unit 38 from an external shock or an intrusion of foreign substances. In particular, since the prism film 35b is prone to being scratched, the protective film 35*a* is provided on the front surface of the prism film 35*b* to prevent scratches from being generated on the prism film 35*b*. The optical sheet 35 may further include a double brightness enhancement film. The double brightness enhancement film may be disposed on a front surface of the protective film 35*a*. The double brightness enhancement film is a type of polarizing film and is also referred to as a reflection type polarizing film. Such a double brightness enhancement film may transmit polarized light in a direction parallel to a polarization direction of the double brightness enhancement film among the light emitted from the light source module 50, and may reflect polarized light in a direction which differs from the polarization direction of the double brightness enhancement film.

As illustrated in FIG. 10, a heat collection device 100' for collecting heat generated by the light source module 50' may be provided between the light source module 50' seated on the rear chassis 60' and the bottom rear surface portion 60*a*' of the rear chassis 60'. Specifically, the heat collection device 100' may be seated on a seating groove 65' provided on the bottom rear surface portion 60*a*' to be supported by the rear chassis 60'.

The heat collection device 100' may include a heat collection part 110' disposed to correspond to a location of the light source module 50' in a front-rear direction of the outdoor display apparatus 1', and a discharge part 120' extending to a region on which the light source modules 50' is not disposed.

The heat collection part 110' may collect heat generated by the light source module 50', and the discharge part 120' may transfer the heat collected in the heat collection part 110' and discharge the heat to the outside of the heat collection device 100'.

A high-temperature heat region A formed by heat generated by the light source module 50' and a low-temperature heat region B, which has a relatively lower temperature than that of the high-temperature heat region A because the light source module 50' is not disposed therein, are formed on the rear chassis 60', and the heat collection part 110' is disposed in the high-temperature heat region A and the discharge part 120' is disposed in the low-temperature heat region B.

Accordingly, heat in the high-temperature heat region A is collected by the heat collection part 110' and is then transferred to the discharge part 120' so that the temperature of the high-temperature heat region A may be lowered. In addition, heat is discharged from the discharge part 120' disposed in the low-temperature heat region B, and the heat discharge device disposed behind the rear chassis 60' may discharge heat, which is discharged from the discharge part 120' and collected in the low-temperature heat region B, to the outside of the outdoor display apparatus 1'.

Like the outdoor display apparatus 1' and the outdoor display apparatus 1, the heat collection devices 100 and 100' and the heat discharge device 200 may be applied to both an edge type display apparatus and a direct type display apparatus.

Hereinafter, a heat collection device 300 of an outdoor display apparatus 1" according to an example embodiment of the present disclosure will be described. Configurations except the heat collection device 300 described below are identical to those of the outdoor display apparatus 1 according to an example embodiment of the present disclosure as described above, and thus overlapping descriptions of the same configurations will be omitted.

Figure 11:
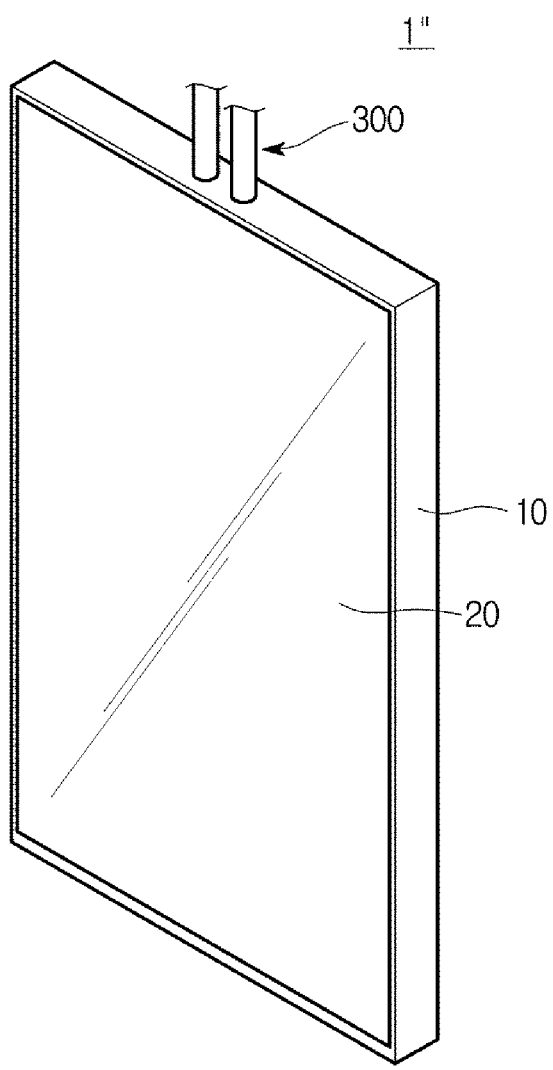
FIG. 11 is a perspective view of an outdoor display device according to an example embodiment of the present disclosure.
Figure 12:
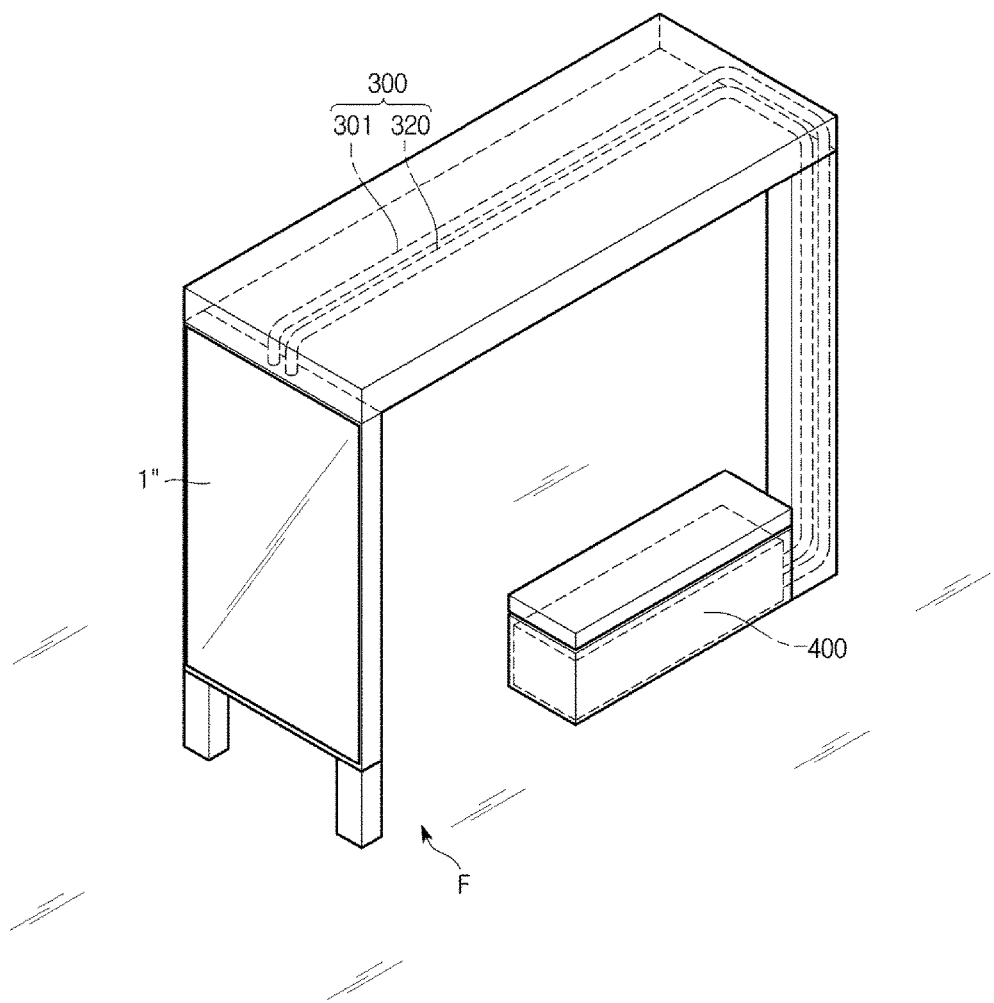
FIG. 12 is a view showing application of an outdoor display device according to an example embodiment of the present disclosure.
Figure 13:
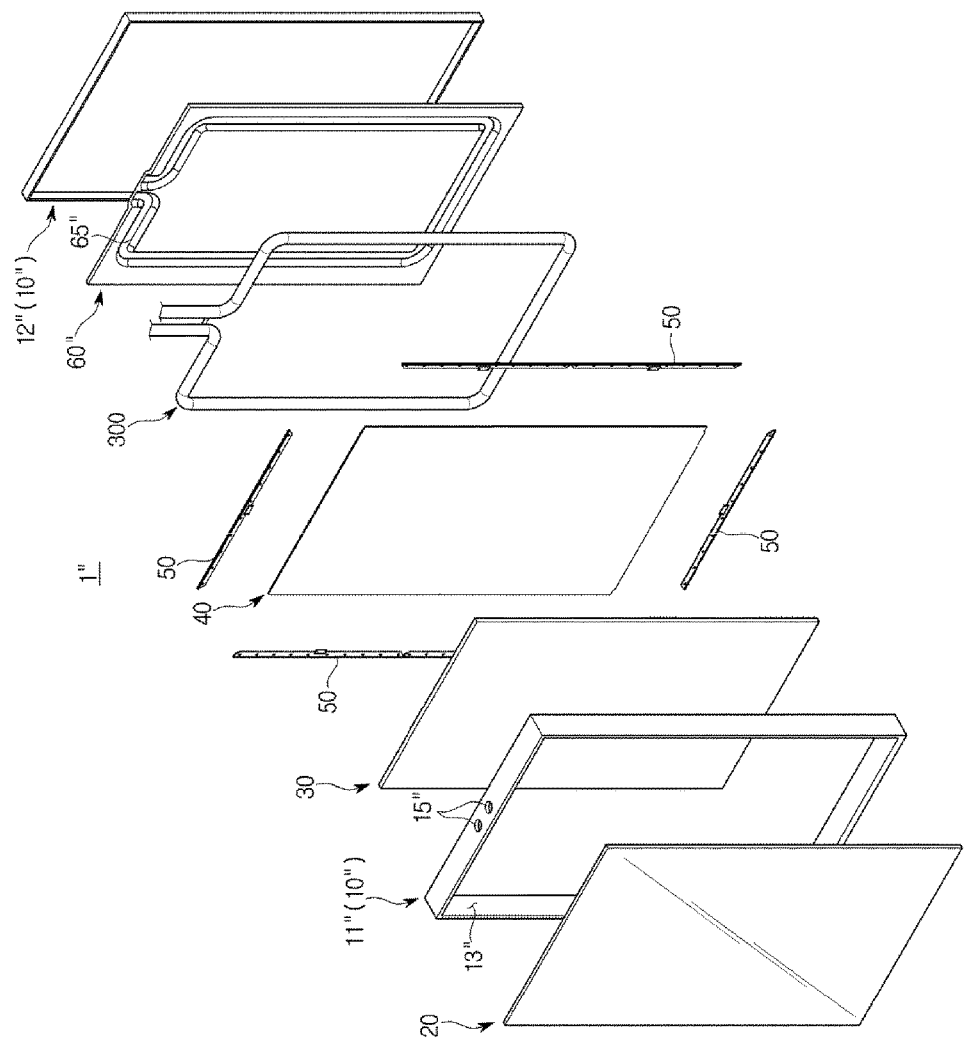
FIG. 13 is an exploded perspective view of an outdoor display device according to an example embodiment of the present disclosure.
Figure 14:
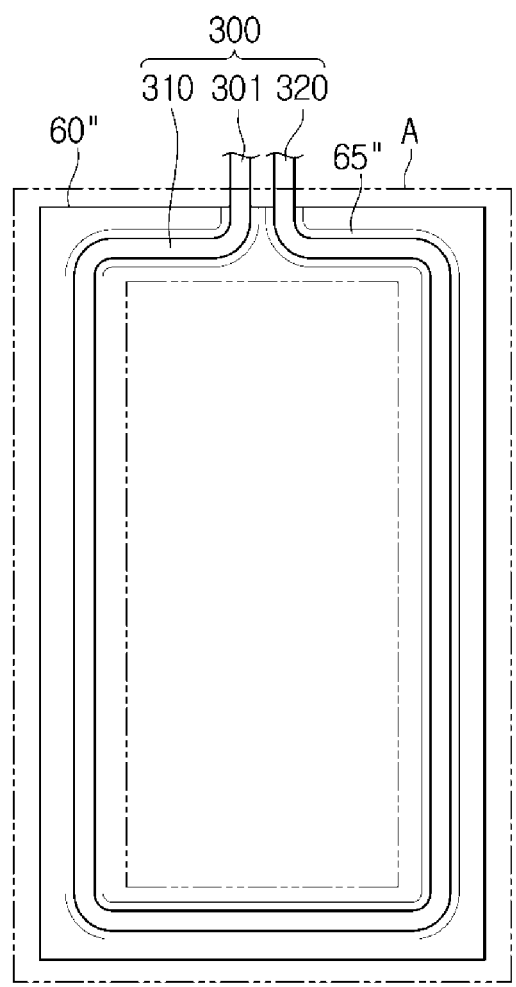
FIG. 14 is a front view of a part of the configuration of an outdoor display device according to an example embodiment of the present disclosure.
Figure 15:
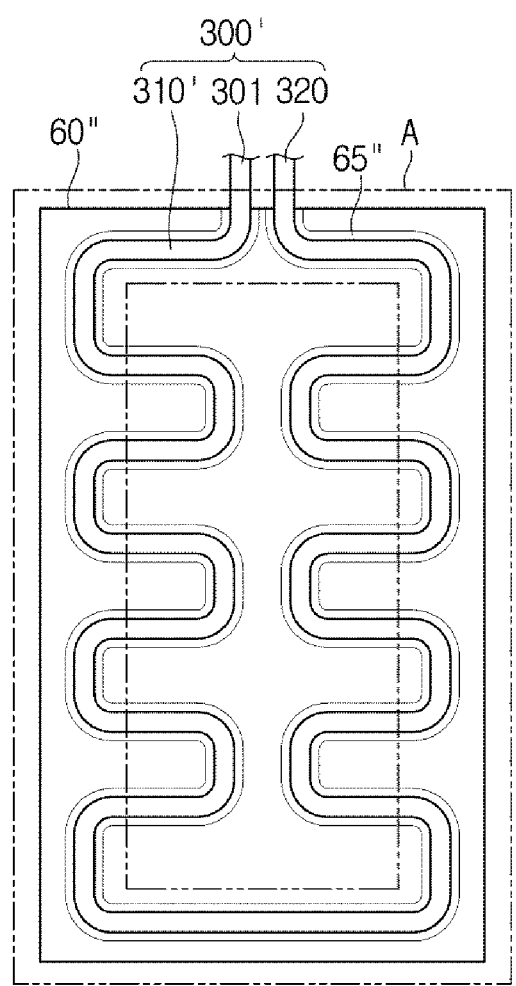
FIG. 15 is a front view of a part of the configuration of an outdoor display device according to an example embodiment of the present disclosure.

FIG. 11 is a perspective view of an outdoor display apparatus according to an example embodiment of the present disclosure, FIG. 12 is a view illustrating a structure to which the outdoor display apparatus according to an example embodiment of the present disclosure is applied, FIG. 13 is an exploded perspective view of the outdoor display apparatus according to an example embodiment of the present disclosure, FIG. 14 is a front view of a part of a configuration of the outdoor display apparatus according to an example embodiment of the present disclosure, and FIG. 15 is a front view of a part of the configuration of the outdoor display apparatus according to an example embodiment of the present disclosure.

As shown in FIGS. 11 and 12, the outdoor display apparatus 1" according to an example embodiment of the present disclosure may include the heat collection device 300 configured to collect heat generated by the outdoor display apparatus 1". The heat collection device 300 may be configured to extend from an inside of the outdoor display apparatus 1" to an outside of the outdoor display apparatus 1".

The heat collection device 300 may be formed of a liquid cooling tube. Water or a refrigerant circulating in the liquid cooling tube may flow into the outdoor display apparatus 1", collect heat generated by the outdoor display apparatus 1", and flow to the outside of the outdoor display apparatus 1" to cool the display apparatus 1".

The outdoor display apparatus 1" may include a heat discharge device 400 disposed outside the outdoor display apparatus 1". The heat discharge device 400 may be connected to the heat collection device 300 extending to the outside of the outdoor display apparatus 1" so that the refrigerant flowing in the liquid cooling tube may pass through the heat discharge device 400.

The heat discharge device 400 may be provided with a circulation pump for circulating the refrigerant and a blowing fan or heat exchange fins provided for discharging heat of the refrigerant passing through the heat discharge device 400.

Accordingly, a refrigerant collecting heat generated by the outdoor display apparatus 1" flows to the outside of the outdoor display apparatus 1" and discharges the heat to the outside through the blowing fan or the heat exchange fins while passing through the heat discharge device 400. Consequently, it is possible to discharge the heat generated by the outdoor display apparatus 1" to the outside.

Unlike the outdoor display apparatus 1 as described above, since the heat discharge device 400 is disposed outside the outdoor display apparatus 1", it is possible for a configuration of the outdoor display apparatus 1" to be slim.

Therefore, it is possible for a configuration of the outdoor display apparatus 1" to be slimmer, as shown in FIG. 12, and the aesthetics of the outdoor display apparatus 1" and a construction including the same may be enhanced by separating the heat discharge device 400 from the outdoor display apparatus 1".

As one example, when a construction F including the outdoor display apparatus 1" is a bus stop structure (e.g., a bus stop shelter), as shown in FIG. 12, a panel including the outdoor display apparatus 1" is arranged at one side of the bus stop structure, and the heat discharge device is disposed to be apart from this panel so that it is possible for the panel including the outdoor display apparatus 1" to be slim. In addition, since there is no structure configured to discharge hot air in all directions of the outdoor display apparatus 1" with the possible exception of the heat collection device 300 exiting from the top, it is possible to provide convenience to a user adjacent to the outdoor display apparatus 1" by minimizing the exhaust heat or noise that might be otherwise generated.

As shown in FIGS. 13 and 14, the outdoor display apparatus 1" may include a housing 10" forming an exterior thereof. An opening 13" may be formed in a front surface of the housing 10", and an image displayed on a display panel 30 may be visible to the outside through the opening.

The housing 10" may include a first frame 11". The first frame 11" may have a box shape having open front and rear surfaces. The open front surface of the first frame 11" may be defined as the opening 13".

One or more through holes 15" through which the heat collection device 300 passes may be provided at an upper side of the first frame 11". The through holes 15" are provided as a pair of through holes, an inlet portion 301 extending from the heat discharge device 400 and into which the refrigerant flows may pass through one through hole 15", and a discharge part 320" through which heat in the outdoor display apparatus 1" is transferred may pass through the other through hole 15".

The housing 10" may further include a second frame 12". The second frame 12" may be coupled to the first frame 11". Specifically, the second frame 12" may be coupled to the open rear surface of the first frame 11" to form the exterior of the outdoor display apparatus 1" together with the first frame 11".

Unlike the second frame 12 of the outdoor display apparatus 1 according to an example embodiment of the present disclosure discussed above, since the heat discharge device 400 is not provided in the outdoor display apparatus 1" but is disposed outside the outdoor display apparatus 1", the second frame 12" need not include a space for accommodating the heat discharge device 400 or a discharge port through which air discharged from the heat discharge device 400 is discharged.

The outdoor display apparatus 1" may further include a protective glass 20 disposed to protect the display panel 30. Specifically, the protective glass 20 may be coupled to the opening 13" of the housing 10".

The outdoor display apparatus 1" may include the display panel 30, a light source module 50 including a plurality of light sources for generating light, and a light guide plate 40 disposed at the rear of the display panel 30 and configured to guide light generated by the light source module 50 to the display panel 30.

In addition, the outdoor display apparatus 1" may include a rear chassis 60" configured to support the light source module 50. The rear chassis 60" is disposed behind the light guide plate 40 and may support the light guide plate 40 and the light source module 50 together therewith.

The outdoor display apparatus 1" may include the heat collection device 300 formed of the liquid cooling tube as described above. The heat collection device 300 may be supported by the rear chassis 60". Specifically, the heat collection device 300 may be seated in a seating groove 65" formed on a front surface of the rear chassis 60" to be supported by the rear chassis 60".

The light source module 50 is composed of four light source modules to radiate light to the four side surfaces of the light guide plate 40 and is disposed to correspond to a side surface of the light guide plate 40. Therefore, the light source module may be disposed on a front surface of an edge side of the rear chassis 60".

The heat collection device 300 may include a heat collection part 310 disposed at a location corresponding to the light source module 50 in a front-rear direction of the outdoor display apparatus 1", and a discharge part 320 extending from the heat collection part 310 to the outside of the outdoor display apparatus 1".

The heat collection part 310 may be arranged on an edge portion of the rear chassis 60". One side of the heat collection part 310 may be connected to the inlet portion 301 connected to the heat discharge device 400, and the other side of the heat collection part 310 may be connected to the discharge part 320 (see FIG. 12).

The heat collection device 300 is configured such that the refrigerant flowing in the heat discharge device 400 due to the circulation pump flows to the heat collection part 310 to collect heat generated by the light source module 50 and the display panel 30, and the refrigerant circulated in the heat collection part 310 may flow to the discharge part 320 and then flow to the heat discharge device 400. The refrigerant circulated and heated in the heat collection part 310 may discharge the heat to the outside through the blowing fan or the heat exchanging fins provided in the heat discharge device 400, and may then flow back to the inlet portion 301 to enter the outdoor display apparatus 1".

In order to enhance cooling efficiency of the outdoor display apparatus 1", the heat collection part 310 may be disposed in the high-temperature heat region A. That is, the high-temperature heat region A is formed by the light source module 50 at the edge portion of the rear chassis 60", and accordingly the heat collection part 310 may be disposed along the edge portion of the rear chassis 60".

Furthermore, as shown in FIG. 15, the heat collection part 310 of the outdoor display apparatus 1" according to an example embodiment of the present disclosure may also be arranged in a region other than the high-temperature heat region A.

This is because, unlike the outdoor display apparatus 1" according to an example embodiment of the present disclosure, the discharge part 320 and the heat discharge device 400 are not disposed in the low-temperature heat region B. In other words, unlike the outdoor display apparatus 1 according to an example embodiment described above, the rear chassis 60" does not include a region in which heat is collected.

Accordingly, the heat collection part 310 may collect heat transferred to the low-temperature heat region B in addition to heat transferred to the high-temperature heat region A to enhance the cooling efficiency.

As a result, the refrigerant may discharge heat generated by the outdoor display apparatus 1" to the outside of the outdoor display apparatus 1" while circulating in and out of the outdoor display apparatus 1" to effectively cool the outdoor display apparatus 1".

As is apparent from the above description, heat generated by a display panel or a backlight unit may be collected through a heat collection device including a heat pipe or a cooling flow path, and the collected heat may be discharged to the outside of a display apparatus by the heat discharge device to effectively prevent deterioration of a liquid crystal panel.

Accordingly, by adopting a heat dissipation structure with no fan and air filter, it is possible to reduce maintenance costs, realize a simple heat dissipation structure, and obtain a slim design of the display apparatus.

In the above description, the example embodiments of the present disclosure have been shown and described. However, the present disclosure is not limited to the above example embodiments, and one skilled in the art to which the present disclosure pertains may easily change and modify the present disclosure without departing from the gist of the technical spirit of the disclosure defined in the claims.

What is claimed is:

1. A display apparatus comprising:
a display panel on which an image is displayed;
a light source module comprising a light source configured to generate light, the light source module being disposed behind the display panel;
a rear chassis configured to support the light source module and disposed behind the light source module;
a heat collection device supported by the rear chassis and comprising a heat collection part, which is disposed at a location corresponding to the light source module, and a discharge part configured to discharge heat collected in the heat collection part and transferred to the discharge part; and
a heat discharge device configured to discharge the heat discharged from the discharge part to an outside of the display apparatus,
wherein the heat collection device comprises a fluid cooling tube connected to the display apparatus from the outside of the display apparatus.

2. The display apparatus according to claim 1, wherein the heat collection device comprises a heat pipe.

3. The display apparatus according to claim 1, wherein the heat collection device is configured to transfer the heat, which is collected in the heat collection part by a refrigerant flowing in the heat collection device, to the discharge part.

4. The display apparatus according to claim 2, wherein the heat pipe comprises a first region disposed to correspond to the light source module and a second region bent and extending from the first region,
wherein the heat collection part is formed at the first region, and
wherein the discharge part is formed at the second region.

5. The display apparatus according to claim 4, wherein the first region is disposed at an edge side of the rear chassis, and
wherein the second region bends and extends from the first region in a direction towards a central portion of the rear chassis.

6. The display apparatus according to claim 2, wherein the heat pipe is disposed to be coplanar with the rear chassis and is seated and supported in a supporting groove formed to be concave from a front side of the rear chassis to a rear side of the rear chassis.

7. The display apparatus according to claim 5, wherein the heat discharge device is coupled to a rear side of the rear chassis and is disposed at the central portion of the rear chassis.

8. The display apparatus according to claim 7, wherein the heat discharge device comprises a blowing fan configured to blow the heat to the outside.

9. The display apparatus according to claim 7, wherein the heat discharge device comprises a heat exchange fin configured to exchange the heat with outside air.

10. The display apparatus according to claim 1, wherein the fluid cooling tube comprises a first region disposed inside the display apparatus and a second region disposed outside the display apparatus,
wherein the heat collection part is formed at the first region, and
wherein the discharge part is formed at the second region.

11. The display apparatus according to claim 10, wherein the heat discharge device comprises:
a pump provided to allow a fluid to flow in a refrigerant cooling tube; and
a heat exchange fin configured to allow the refrigerant which is flowing to exchange heat with outside air.

12. The display apparatus according to claim 10, wherein the heat discharge device is disposed outside the display apparatus and is connected to the second region.

13. The display apparatus according to claim 1, further comprising a heat conductor provided between the light source module and the heat collection device.

14. A display apparatus comprising:
a display panel on which an image is displayed;
a light source module comprising a light source configured to generate light, the light source module being disposed behind the display panel;
a rear chassis configured to support the light source module and disposed behind the light source module;
a heat collection device comprising a first region disposed at an edge portion of the rear chassis and a second region extending toward a central portion of the rear chassis; and
a heat discharge device configured to discharge heat collected in the heat collection device and disposed to correspond to the central portion,
wherein the heat collection device further comprises a fluid cooling tube connected to the display apparatus from the outside of the display apparatus.

15. The display apparatus according to claim 14, further comprising a light guide plate configured to guide the light generated by the light source to the display panel,
wherein the first region collects heat generated by the light guide plate and the light source module,
wherein the second region transfers the heat collected in the first region and discharge the heat to an outside of the heat collection device, and
wherein the heat discharge device discharges the heat discharged from the second region to an outside of the display apparatus.

16. The display apparatus according to claim 14, wherein the first region is disposed behind the light source module to correspond to the light source module.

17. The display apparatus according to claim 14, wherein the heat discharge device is provided behind the rear chassis and is disposed to correspond the second region behind the second region in a front-rear direction of the display apparatus.

18. A display apparatus comprising:
a display panel on which an image is displayed in a forward direction;
a housing configured to cover the display panel;
a light source module comprising a light source configured to generate light, and disposed behind the display panel;
a heat discharge device configured to discharge heat generated in the housing to an outside of the housing; and
a heat collection device comprising a heat collection part disposed to correspond to the light source module in a front-rear direction of the housing and a discharge part extending from the heat collection part to correspond to the heat discharge device in the front-rear direction of the housing and configured to discharge heat collected in the heat collection part to the heat discharge device,
wherein the heat collection device further comprises a fluid cooling tube connected to the display apparatus from the outside of the housing.

* * * * *